Aug. 29, 1967     A. G. DOWN ETAL     3,338,775
SPIN WELDING HEAD
Filed May 27, 1964
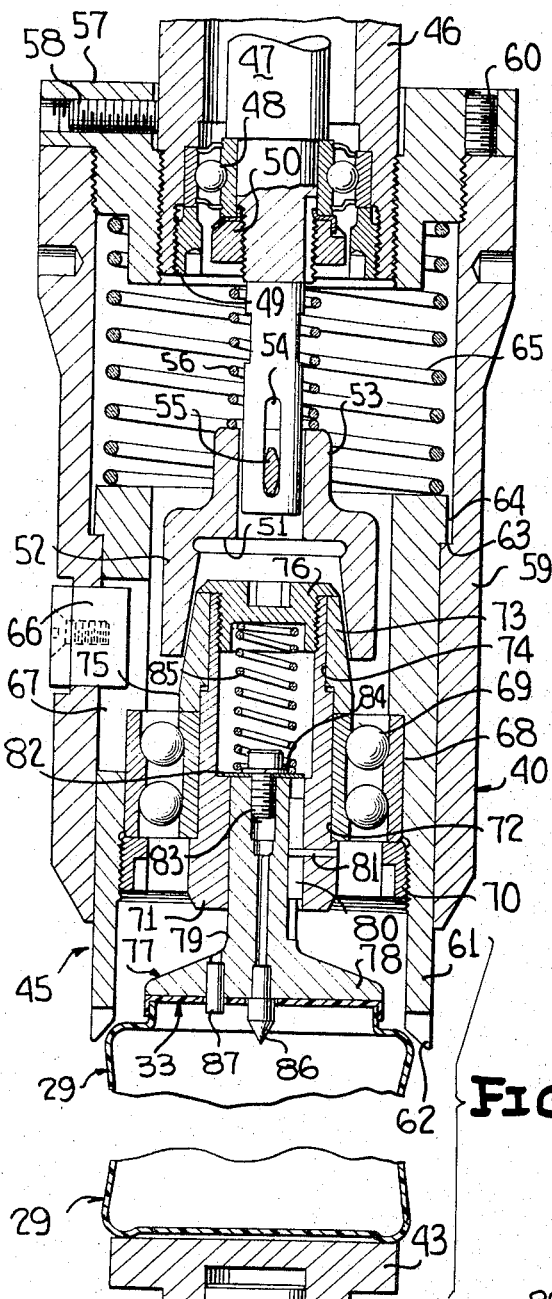
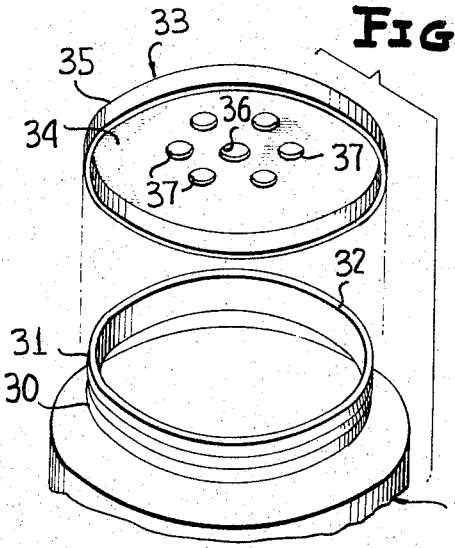
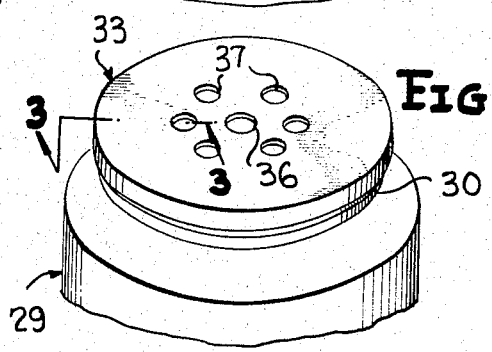
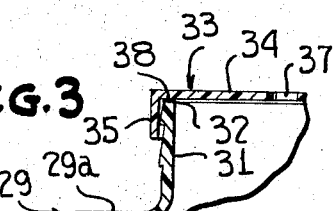
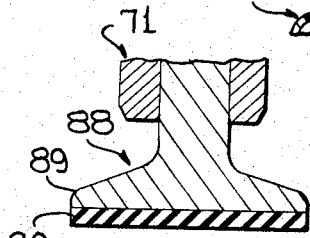
INVENTORS
ALFRED G. DOWN,
HOWARD M. TURNER
& HARRY W. DAUER
BY
ATTORNEYS

United States Patent Office 3,338,775
Patented Aug. 29, 1967

1

3,338,775
SPIN WELDING HEAD
Alfred G. Down, Wood Dale, Howard M. Turner, Oak Forest, and Harry W. Dauer, Berwyn, Ill., assignors to Continental Can Company, Inc., New York, N.Y., a corporation of New York
Filed May 27, 1964, Ser. No. 370,613
4 Claims. (Cl. 156—582)

This invention relates in general to new and useful improvements in apparatus for spin welding together elements, and more particularly relates to a novel spin welding head.

This invention particularly relates to a spin welding head which is to be used in spin welding a container closure to a container and wherein relative rotation of a portion of the spin welding head with respect to an engaged part of the container or the closure therefor is undesirable. In the past there has been developed a suitable spin welding apparatus. However, at times relative rotation between the chuck of the spin welding head and the portion of the article driven by the chuck has occurred with the result that the article is marred. It is the primary object of this invention to avoid such relative rotation.

Another object of this invention is to provide a novel spin welding head which includes both a spinning chuck and a hold down member, the spin welding head being so constructed whereby the spinning chuck is completely engaged with the article to be spun thereby prior to the driving of the chuck whereby relative rotation between the chuck and the article driven thereby is eliminated.

Another object of this invention is to provide a novel spin welding head which includes a chuck and an article hold down member and wherein the chuck is driven from a rotating drive shaft by means of a clutch, the driving of the chuck being controlled by the position of the hold down member whereby the chuck is first engaged with the article to be spun, after which the associated hold down member is brought into engagement with the portion of the article to be held in place during the spinning operation, followed by the engagement of the clutch due to the shifting of the hold down member.

A further object of this invention is to provide a novel apparatus for spin welding together two elements, the apparatus including a platform on which the article which is to be spin welded together is seated, a support aligned with the platform and carrying a spin welding head, the spin welding head including an article hold down member and a chuck which are axially movable with respect to the support, the platform and the support being relatively movable one with respect to the other to effect the engagement of the chuck and the hold down member with the article to be welded, and the chuck being driven in response to the movement of the chuck and the hold down member by the engagement of the article therewith.

With the above and other objects in view that will hereinafter appear, the nature of the invention will be more clearly understood by reference to the following detailed description, the appended claims and the several views illustrated in the accompanying drawing:

In the drawing:

FIGURE 1 is a fragmentary exploded perspective view of the general details of the neck portion of a container and an associated closure which may be welded together utilizing the apparatus of this invention.

FIGURE 2 is a fragmentary perspective view showing the closure welded to the container neck portion.

FIGURE 3 is an enlarged fragmentary vertical sectional view taken along the line 3—3 of FIGURE 2 and shows the specific welded connection between the closure and the container neck portion.

FIGURE 4 is a vertical sectional view taken through the spin welding unit and shows the specific details thereof.

FIGURE 5 is a fragmentary vertical sectional view taken through a modified form of chuck.

FIGURE 6 is an enlarged fragmentary vertical sectional view similar to FIGURE 3 and shows a modified form of closure and container relationship.

Referring now to the drawings in detail, reference is first made to FIGURES 1, 2 and 3 wherein there is illustrated a container which may be closed utilizing the apparatus of this invention, the container being generally referred to by the numeral 29. The container 29 is preferably formed of a plastic material although it is feasible to form it of other materials which will bond to a melted plastic material. The container 29 is provided with a generally cylindrical neck 30 which terminates at its upper end in an upwardly projecting collar 31 and which has an extreme upper surface 32. Except for the construction of the neck 30, the construction of the container 29 is immaterial.

The container 29 has the open upper end thereof closed by a closure, generally referred to by the numeral 33. The closure 33 includes an end panel 34 and a depending skirt 35. The skirt 35 is dimensioned so as to closely engage the collar 31. In order to dispense the contents of the container 29, the closure 33 is provided in the end panel 34 with a central opening 36 and a plurality of outer circumferentially spaced openings 37.

The closure 33 is secured to the container 29 by first setting the closure 33 on the neck 30 of the container 29, and then welding the closure 33 to the container 29 by rapidly spinning the closure 33 relative to the container, with the closure being in frictional contact with the extreme upper end surface 32 of the container neck 30.

An alternative may be provided by the closure skirt being long enough to frictionally engage the shoulder 29a in which the weld would not be made between the upper end surface 32, as shown in FIGURE 6. As a result of this rapid spinning of the closure 33 with respect to the container 29, the surfaces in frictional engagement will become heated, the plastic material will melt and a bond between the melted plastic material will be formed, the bond being shown in FIGURE 3 and being referred to by the numeral 38.

Reference is now made to FIGURE 4 wherein there is illustrated a spin welding unit formed in accordance with this invention, the spin welding unit being generally referred to by the numeral 40. The spin welding unit 40 includes a container supporting pedestal or pad 43 mounted for vertical movement by means of a supporting shaft 44. The manner in which the supporting shaft 44 is vertically reciprocated is immaterial and is not a part of this invention. The spin welding unit 40 also includes a spin welding head which is generally referred to by the numeral 45. The spin welding head 45 is mounted in vertical alignment with the pedestal 43 and includes an upper support 46. The support 46 is fixedly mounted against vertical movement in any desired manner. At this time it is pointed out that the support 46 may be fixed against any type of movement, except for adjustment for containers of different heights. It may also be included as part of a turret assembly in which case the spin welding unit revolves about an axis as part of the turret as the welding operation takes place. It is to be understood that if the spin welding unit 40 is part of a turret, there may be a plurality of such spin welding units at circumferentially spaced intervals.

The spin welding head 45 includes a drive shaft 47 which is constantly rotated in any desired manner. The drive shaft 47 extends down through the support 46, which is of a tubular construction, and is rotatably journalled in the lower part of the support 46 by means of a bearing 48. The outer race of the bearing 48 is secured in place within the support 46 by means of a retainer 49. The inner race of the bearing 48 is secured in place on the drive shaft 47 by means of a retainer 50 which is threadedly engaged on the drive shaft 47.

It is to be noted that the drive shaft 47 projects down below the retainer 50 a considerable distance and has mounted thereon an upper clutch half 51. The clutch upper half 51 includes a conical lower portion 52 and an upper mounting sleeve 53. The mounting sleeve 53 is telescoped over the lower end of the drive shaft 47 and is sufficiently loosely mounted thereon for free vertical sliding movement and self-alignment.

The lower end of the drive shaft 47 is provided with a vertically elongated slot 54 in which there is positioned a driving key 55 which is carried by the mounting sleeve 53. In this manner the upper clutch half 51 is driven from the drive shaft 47 while being free to move axially therealong. A spring 56 encircles the lower portion of the drive shaft 47 and bears against the upper end of the mounting sleeve 53 to resiliently urge the upper clutch half 51 to a lowermost position at all times.

The lower end of the support 46 has threadedly engaged thereon an adapter 57. The adapter 57 is locked in place on the support 46 by means of a locking set screw 58. The adapter 57 is also externally threaded and has threadedly engaged thereon a tubular extension or sleeve 59. The extension 59 is locked to the adapter 57 by means of a locking set screw 60.

A hold down member 61 is slidably carried by the extension 59 for movement axially of the drive shaft 47. The hold down member 61 is of a generally cylindrical configuration and is telescoped within the lower portion of the extension 59. The lower part of the hold down member 61 depends below the extension 49 and includes a lower end portion 62 which is particularly adapted to engage and clamp an article in place on which welding is to take place.

It is to be noted that the extension 59 has an upper part which is of an increased internal diameter as compared to the lower part thereof to define an upwardly facing shoulder 63. The hold down member 61 is externally enlarged at its upper end to define a downwardly facing shoulder 64. The shoulders 63 and 64 are engageable to limit the downward movement of the hold down member 61. A spring 65 extends between the adapter 57 and the upper end of the hold down member 61 and resiliently urges the hold down member to its lowermost position.

The hold down member 61 being intended for vertical movement only and being non-rotatable with respect to the extension 59, the extension 59 is provided with a guide key 66. The guide key 66 projects inwardly from the connection 59 and is positioned in a vertical slot 67 formed within the hold down member 61. The vertical slot 67 is also dimensioned so as to limit the upward movement of the hold down member 61 into the extension 59.

The hold down member 61 has a central portion thereof internally enlarged to define a seat 68. An outer race of a bearing 69 is seated in the seat 68 and is locked in place by means of a nut 70 which is threadedly engaged with the hold down member 61. The bearing 69 supports a tubular carrier 71 for rotation relative to the hold down member 61 and for axial movement therewith.

The carrier 71 is of a tubular construction and the external surface thereof is stepped to provide a first seat 72 for the inner race of the bearing 69. A second seat 73 is disposed above the first seat 72 and has seated thereon a lower clutch 74. The clutch half 74 has a depending skirt 75 which abuts against the upper end of the inner race of the bearing 69 and serves to retain the inner race of the bearing 69 in place. A locking plug or nut 76 is threadedly engaged in the upper end of the carrier 71 and secures the lower clutch half 74 and the bearing 69 in place on the carrier 71. At this time it is pointed out that the lower clutch half 74 is of a conical shape so as to internest within the upper clutch half 51. However, normally the clutch halves 51 and 74 are vertically spaced so as to prevent driving of the carrier 71 by the drive shaft 47. Although the clutch has been disclosed herein as being of the cone type, it will be evident that other types of clutches may also be used.

The carrier 71 carries a spinning chuck which is generally referred to by the numeral 77. The spinning chuck 77 includes a lower pressure plate portion 78 which has an upper shank 79. The shank 79 is telescoped within the lower part of the carrier 71 and is driven by the carrier 71 for rotation therewith by means of a key 80. The key 80 is disposed in suitable keyways formed both in the shank 79 and the carrier 71 and is locked in place relative to the carrier 71 by a pin 81. In this manner the spinning chuck 77 is mounted for axial movement relative to the carrier 71 while being rotatable therewith. A splined shank 79 may be employed in lieu of the key 80 and pin 81 if so desired.

The downward movement of the spinning chuck 77 out of the carrier 71 is prevented by a flat washer 82 which is secured in place by means of a fastener 83. The fastener 83 is threadedly engaged in the upper end of the shank 79 and is locked against rotation by a lock washer 84.

In order for the spin welding head 45 to properly function, it is necessary that there be a controlled upward movement of the spinning chuck 77 relative to the carrier 71. Accordingly, the upward movement of the spinning chuck 77 relative to the carrier 71 is resiliently resisted by a spring 85 which is disposed within the carrier 71 and which has the opposite ends thereof bearing against the plug 76 and the flat washer 82.

The spinning chuck 77 is particularly adapted for cooperation with the closure 33. It is to be noted that the pressure plate portion 78 has extending downwardly therefrom a centrally located center pin 86 which is adapted to be received within the center opening 36 in the closure 33. The center pin having a pointed end, automatically centers the closure 33 and the container 29 with the spin welding head 45.

The pressure plate portion 78 also has extending downwardly therefrom a drive pin 87. The drive pin 87 is offset from the center of the pressure plate portion 78 a distance equal to the offsetting of the openings 37 so that it is receivable in one of the openings 37 of the closure 33 to effect a driving interlock between the spinning chuck and the closure 33.

*Operation*

In the use of the spin welding unit 40, a container 29 and its associated closure 33 are seated on the platform 43. The supporting shaft 44 is then moved upwardly to elevate the platform with the result that the container 29 and its closure 33 are lifted towards the chuck 77. Although the pad 43 has been disclosed as lifting the container towards the spinning head, the primary objective is to change the relative vertical positions of these units, and the spinning head may be moved towards the pad for performing the welding operation, if so desired. As the closure 33 moves upwardly, it engages the tapered lower end of the center pin 86 and is automatically centered as the center pin moves into the opening 36. Further upward movement of the closure 33 results in the drive pin 87 entering into one of the openings 37. As the closure 33 continues to move upwardly, the end panel 34 thereof comes into engagement with the pressure plate portion 78. This specific relationship of the container 29, the closure 33 and the spin welding head 45 is clearly shown in FIGURE 4.

It is to be noted from FIGURE 4 that at the time the closure 33 comes into engagement with the pressure plate portion 78, the container 29 is still out of engagement with the hold down member 61. However, slight additional upward movement of the container 29 brings the container 29 into contact with the hold down member 61. During this additional upward movement of the container 29, the chuck 77 is moved upwardly by the closure 33 against the downward urging of the spring 85.

It will be readily apparent from FIGURE 4 that after the container 29 engages the lower end portion 62 of the hold down member 61, further upward movement of the container 29 results in the upward movement of the hold down member 61 against the downward urging of the spring 65. The pressure of the spring 65 is sufficient to tightly clamp the container 29 down against the platform 43 and to prevent rotation of the container relative to the hold down member 61.

It will be readily apparent that at the time the chuck 77 is fully engaged with the closure 33 and the hold down member 61 is fully engaged with the container 29, the clutch comprising the clutch halves 51 and 74 is still disengaged so that although the drive shaft 47 is rotating, the chuck 77 is stationary. The platform 43 is continued to be moved upwardly with the result that the hold down member 61 is moved upwardly relative to the drive shaft 47 and the lower clutch half 74 is brought into interlocking engagement with the upper clutch half 51. The two halves of the clutch now being engaged, the carrier 71 is driven with the result that the spinning chuck 77 is also rotated.

It is to be noted that the platform 43 is mounted for sufficient upward movement to effect the lifting of the upper clutch half against the downward urging of the spring 56. Thus, the loading of the spring 56 is also downwardly directed against the container 29 through the hold down member 61. The resilient mounting of the clutch half 51 also permits sufficient travel of the container 29 and the associated closure 33 to assure the positive engagement of the two clutch halves.

At this time it is pointed out that the pressure exerted by the spring 85 through the chuck 77 to the closure lid provides the spinning pressure on the lid independently of the pressures of springs 56 and 65. The pressures of springs 56 and 65 are collectively applied to the container for holding it independently of the spring 85.

The platform 43 is held in its elevated position a predetermined time, which time is sufficient for the frictional engagement between the rotating closure 33 and the stationary container 29 to effect a melting of the plastic of the mating surfaces thereof. The platform 43 is then lowered initially a distance sufficient to disengage the clutch halves 51 and 74. The platform is then held in this partially lowered position for a short period of time during which time the pressure plate portion 78 of the spinning chuck continues to press downwardly on the closure 33 to hold the fixed relationship of the closure 33 with respect to the container 29 while the melted plastics of the closure and the container harden to weld together the mating surfaces of the closure and the container. The downward movement of the platform 43 is then continued to disengage the closure 33 from the spinning chuck 71 and the container from the hold down member 61, after which the welded together closure and container may be removed from the platform 43.

It is to be understood that the manner in which the containers are loaded onto the platform 43 is not a part of this invention. It is also to be understood that while a single station operation has been illustrated and described, the spin welding unit 40 may well be part of a turret arrangement of the continuously operating type.

It will be evident from the foregoing description that various types of spinning chucks may be employed for coaction with the lid in lieu of the pin type chuck that has been described.

One such variation may be the spinning chuck 88 that is similar to the spinning chuck 77 and has a lower pressure plate portion 89. However, the pressure plate portion 89, in lieu of having projecting pins, is provided with a friction pad 90 on the undersurface thereof. The friction pad 90 may be formed of any suitable material which frictionally engages an article to be driven. Rubber and rubberlike products are the preferred materials for the friction pad, but the friction pad is not so limited in structure.

It is to be understood that the spinning chuck 88 may be mounted in the same manner as the spinning chuck 77 and driven through the carrier 71 to which it is attached. In view of the fact that the only difference between the spinning chuck 77 and the spinning chuck 88 is the article driving means of the two, no further description of the spinning chuck 88 is believed necessary.

Although only a preferred embodiment of the spin welding unit has been specifically illustrated and described herein, it is to be understood that minor variations may be made in the spin welding unit within the spirit and scope of this invention, as defined by the appended claims.

We claim:
1. A spin welding head particularly adapted to spin a first member while holding a second member fixed and the first member in pressurized frictional engagement therewith, said welding head comprising a support, a drive shaft positioned within said support and being suitably mounted for rotation, a hold down member, means mounting said hold down member on said support for movement axially of said drive shaft and fixing said hold down member against rotation relative to said support, resilient means between said support and said hold down member urging said hold down member to a projecting position, bearing means carried by said hold down member supporting a drive member in alignment with said drive shaft for both rotary movement relative to said hold down member and axial movement with said hold down member, an article spinning chuck carried by said drive member for rotation therewith, and cooperable clutch members on said drive shaft and said drive member engageable upon axial shifting of said hold down member.

2. The spin welding head of claim 1 wherein said chuck is mounted for axial movement relative to said drive member, and resilient means carried by said drive member urging said chuck to a projecting position.

3. The spin welding head of claim 1 wherein the clutch member carried by said drive shaft is mounted thereon for axial movement, and resilient means carried by said drive shaft urge said last mentioned clutch member towards the other clutch member.

4. A spin welding unit comprising article supporting platform and a spin welding head, said spin welding head including a support, a drive shaft positioned within said support and being suitably mounted for rotation, a hold down member, means mounting said hold down member on said support for movement axially of said drive shaft and fixing said hold down member against rotation relative to said support, resilient means between said support and said hold down member urging said hold down member to a projecting position, bearing means carried by said hold down member supporting a drive member in alignment with said drive shaft for both rotary movement relative to said hold down member and axial movement with said hold down member, an article spinning chuck carried by said drive member for rotation therewith, and cooperable clutch members on said drive shaft and said drive member engageable upon axial shifting of said hold down member, and means for effective relative movement of said platform and said spin welding head one towards the other to engage an article to be welded with said chuck and said hold down member.

References Cited

UNITED STATES PATENTS 3,078,912  2/1963  Hitzelberger _____ 156—556
3,212,182  10/1965  Hollander _____ 228—2

JOHN F. CAMPBELL, *Primary Examiner.*

M. L. FAIGUS, *Assistant Examiner.*